(12) United States Patent
Burrow (10) Patent No.: US 8,413,954 B1
(45) Date of Patent: Apr. 9, 2013

(54) CONTROL VALVE

(75) Inventor: Mark A. Burrow, Maumee, OH (US)

(73) Assignee: Burrow Industries, Inc., Temperance, MI (US)

( * ) Notice: Subject to any disclaimer, the term of this patent is extended or adjusted under 35 U.S.C. 154(b) by 935 days.

(21) Appl. No.: 11/978,432

(22) Filed: Oct. 29, 2007

Related U.S. Application Data (60) Provisional application No. 60/854,755, filed on Oct. 27, 2006.

(51) Int. Cl.
*F16K 51/00* (2006.01)

(52) U.S. Cl.
USPC .......................................... 251/147; 251/300

(58) Field of Classification Search .................. 251/300, 251/299, 147, 212; 141/255, 256, 264; 222/560, 222/550
See application file for complete search history.

(56) References Cited

U.S. PATENT DOCUMENTS

| | | | | |
|---|---|---|---|---|
| 2,901,148 A | * | 8/1959 | Cunningham et al. | 222/185.1 |
| 3,823,615 A | * | 7/1974 | O'Brien et al. | 73/864.44 |
| 3,845,886 A | * | 11/1974 | Kokeisl | 222/241 |
| 4,043,491 A | * | 8/1977 | Johnson et al. | 222/503 |
| 4,633,923 A | * | 1/1987 | Hinzmann | 141/116 |
| 4,844,292 A | * | 7/1989 | Lonardi et al. | 251/212 |
| 5,657,801 A | * | 8/1997 | Ellis | 141/255 |
| 6,578,743 B1 | * | 6/2003 | Kokeisl | 222/506 |
| 6,969,044 B2 | * | 11/2005 | Delzer et al. | 251/147 |
| 7,137,729 B2 | * | 11/2006 | Moretto | 366/141 |

* cited by examiner

*Primary Examiner* — John K Fristoe, Jr.
*Assistant Examiner* — Andrew J Rost
(74) *Attorney, Agent, or Firm* — Robert E. Witt (57) ABSTRACT

There is disclosed a control valve suitable for particulate flow and/or for a liquid stream, comprising a spherical surface with cut-off top and bottom areas, a cylindrical extension depending from the cut-off top area of said spherical surface, a collar further extending from the cylindrical extension, a common internal diameter passage through said spherical surface, cylindrical extension and collar, and said valve further comprising opposing arcuate lids, having an interior spherical concave surface, hinged to the spherical surface to provide a close tolerance relationship with the spherical surface, and an overlapping band on one of the lids to create an arcuate, spherical, concave, recessed area for reception of the leading surface of the other lid, which lids open and close at fast rates by outside means to provide an intermittent seal to the flow of the particulate or of the liquid during the operation of the control valve.

17 Claims, 7 Drawing Sheets

FIG. 8

CONTROL VALVE

BACKGROUND OF INVENTION

Control values, to regulate the amount of particulate or liquid flowing into various containers, including flexible bags, i.e., paper/plastic and rigid vessels, at given rates have been available for use with filling tubes and the like to fill the containers. Control valves have inherently had problems relative to their size and tolerance relative to product delivery tubes. Further, current control valves comprise a collar with a cylindrical extension, to receive hinged lids, but such construction does not allow or provide a sealed chamber to prevent the escape of particulate or liquid. This has been unhappily accepted in the food industry for some time, and has become more unacceptable with the use of less fats in the flowing particulate stream, leading to more leakage of product during the filling operation and the creation of a dusty environment.

The present invention provides several features which heretofore have not been available for the filling operation of material into containers, including a machined spherical surface with cut-off top and bottom portions and machined opposing arcuate lids, having a spheroidal/spherical shape with interior concave surfaces, whereby during the filling operation, relatively tight tolerances between the moving lids and the spherical surface provides a moving seal at all times, and when the two lids meet, intermittently, generally at high rates, the leading surfaces of the lids provide a sealed chamber to ensure an accurate, metered amount at higher speeds. The above features become extremely desirable, especially when, for example, the food industry expects and/or demands higher/faster fill rates without damaging or compromising the integrity of the product and with less loss of product. Fill rates typically reach speeds of about eighty (80) containers or packages per minute.

SUMMARY OF INVENTION

The present invention comprises a new combination of elements in a control valve suitable for particulate flow and/or for a liquid stream, comprising a spherical surface with cut-off top and bottom areas, a cylindrical extension of said spherical surface, a collar further extending from the cylindrical extension, a common internal diameter passage through said spherical surface, cylindrical extension and collar, and said control valve further comprising opposing arcuate lids hinged to the spherical surface for dynamic sealing engagement with the spherical surface, and an overlapping band on one of the lids comprising a slightly larger radius than the radius of the other lid to provide a close tolerance relationship therebetween and to create an arcuate, spherical concave recessed area for reception of the leading surface of the other lid, which lids are adapted to open and close at fast rates by outside means and to provide an intermittent seal to the flow of the particulate or of the liquid.

Generally, a female clevis is attached to the lower portion of each lid and a male clevis is in communication with each female clevis via a clevis pin, for reception of actuating or connecting rods to move the lids at high rates into the open and closed position to regulate a metered amount of product into a package or container.

Desirable features of the present invention include efficiency of filling and speed of filling. The need to seek and to obtain less spillage of product, especially with food products moving toward less fat for the diet/health conscious consumer, is demanded from the food industry. Likewise, the need to provide a cleaner work environment, especially relative to dust, is sought from the food industry.

Advantages of the present invention include efficiency during filling and higher rates, primarily due to the machined spherical surface which allows the unit to be made smaller without sacrificing the internal diameter of the control valve. Generally, the internal diameter of the interior passage of the control valve is the same internal diameter as the funnel tube where product is advanced via an auger operating intermittently. Limitations regarding tolerances of the movable lids have been a long-standing problem, and the present invention overcomes this problem via the new combination of the movable lids in close tolerance communication with the spherical surface. The present invention allows for the use of larger funnel tubes and augers, which in turn allows more product to flow at a given rate.

When a non-metallic material such as Teflon is placed in proximity to the outside circumferential edge of the spherical surface, this allows the control valve to be used in environments where liquids or very fine dry powders are processed, for example ink toners, graphite powders, powered milk, cocoa, and the like. Likewise, a non-metallic material can be placed on the leading surfaces of the lids (not shown) to enhance the seal characteristics of the control valve.

The new combination of elements of the present invention, particularly the spherical surface and the spherical lids in close tolerance relationship, allows or provides more space at the end of the auger, whereby compression of product or compaction is not an issue as seen in currently employed control valves.

Further, currently employed controlled valves are formed by stamping from stainless steel, which do not comprise a complex configuration and which are not easily controlled for mass production and replacement purposes. The control valve of the present invention, however, by being machined, allows for control of the outer diameter of the spherical surface and of the interior concave surfaces of the lids to meet size requirements/limitations, which thereby allows the largest possible auger/funnel tube to be employed with the bag forming tube of the material delivery system. This, in turn, allows for the use of a larger auger, which increases the speed or rate of product flow.

DETAILED DESCRIPTION OF THE DRAWINGS

The control valve of this invention finds particular utility in the food industry, where the filling of packages, containers, and the like is done at high speeds with desired accurate amounts of product and minimal loss of product during the filling operation.

Specifically, the control valve of this invention is useful in situations where the product is a powdery particulate, which escapes from presently used control valves, leading to not only loss of product, compaction and clogging of equipment, resulting in downtime of production, but also to dust entering the environment to create an unhealthy atmosphere and a messy workplace.

In the construction of the control valve of this invention, it is important to regulate the tolerances of the tool to obtain the desired sealing characteristics. This is accomplished via machining, to reach the desired tolerances. Machining the elements of the control valve allows for reproducibility and replacement of the tool, which is used in combination with the funnel tube assembly through which product flows. Relatively tight tolerances can be employed, from 0.001-0.005 inches, and preferably from 0.002-0.003 inches between the lids and the spherical surface.

Figure 1:
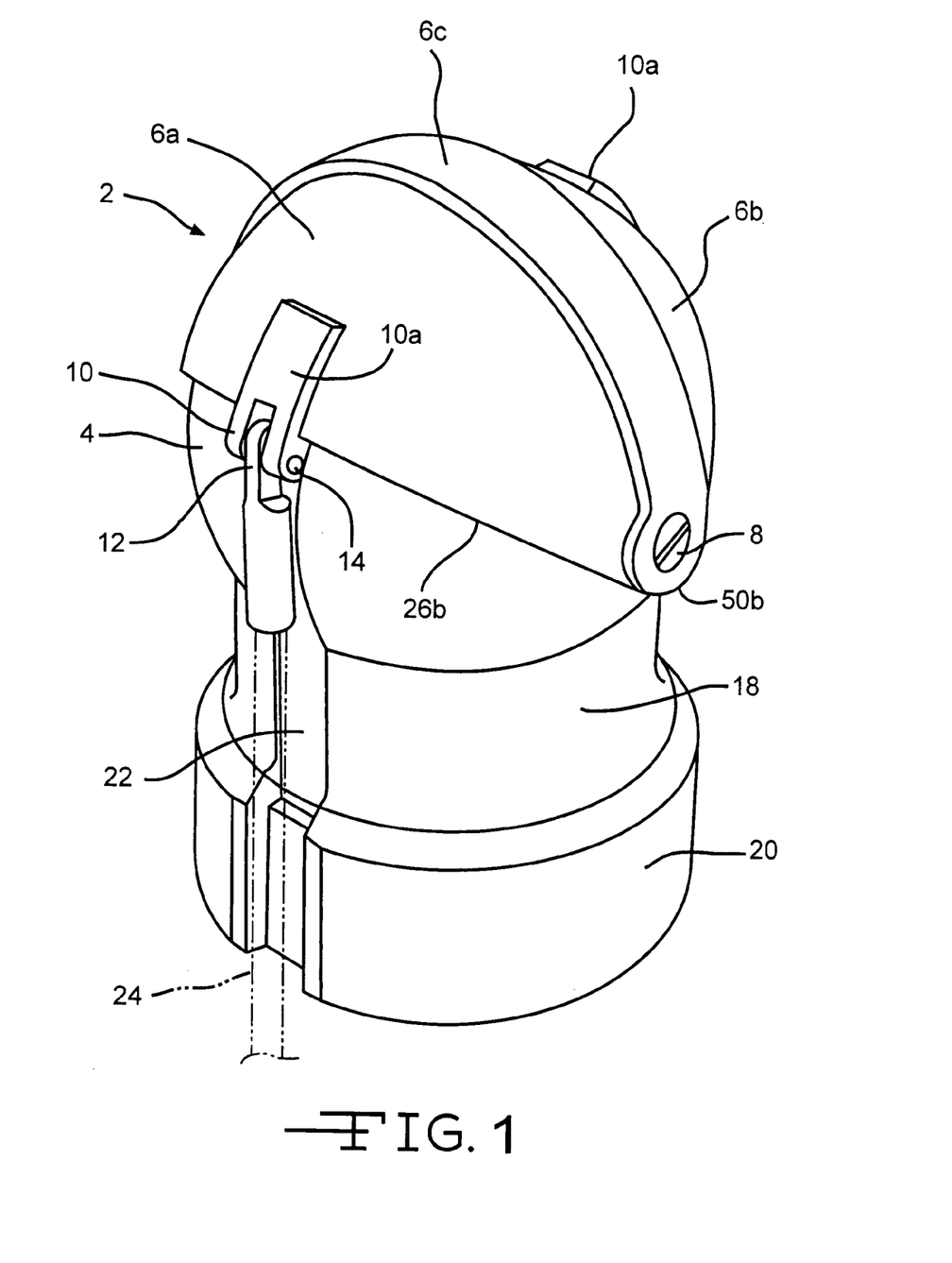
FIG. 1 is a front perspective view of the Control Valve in the closed position.
Figure 2:
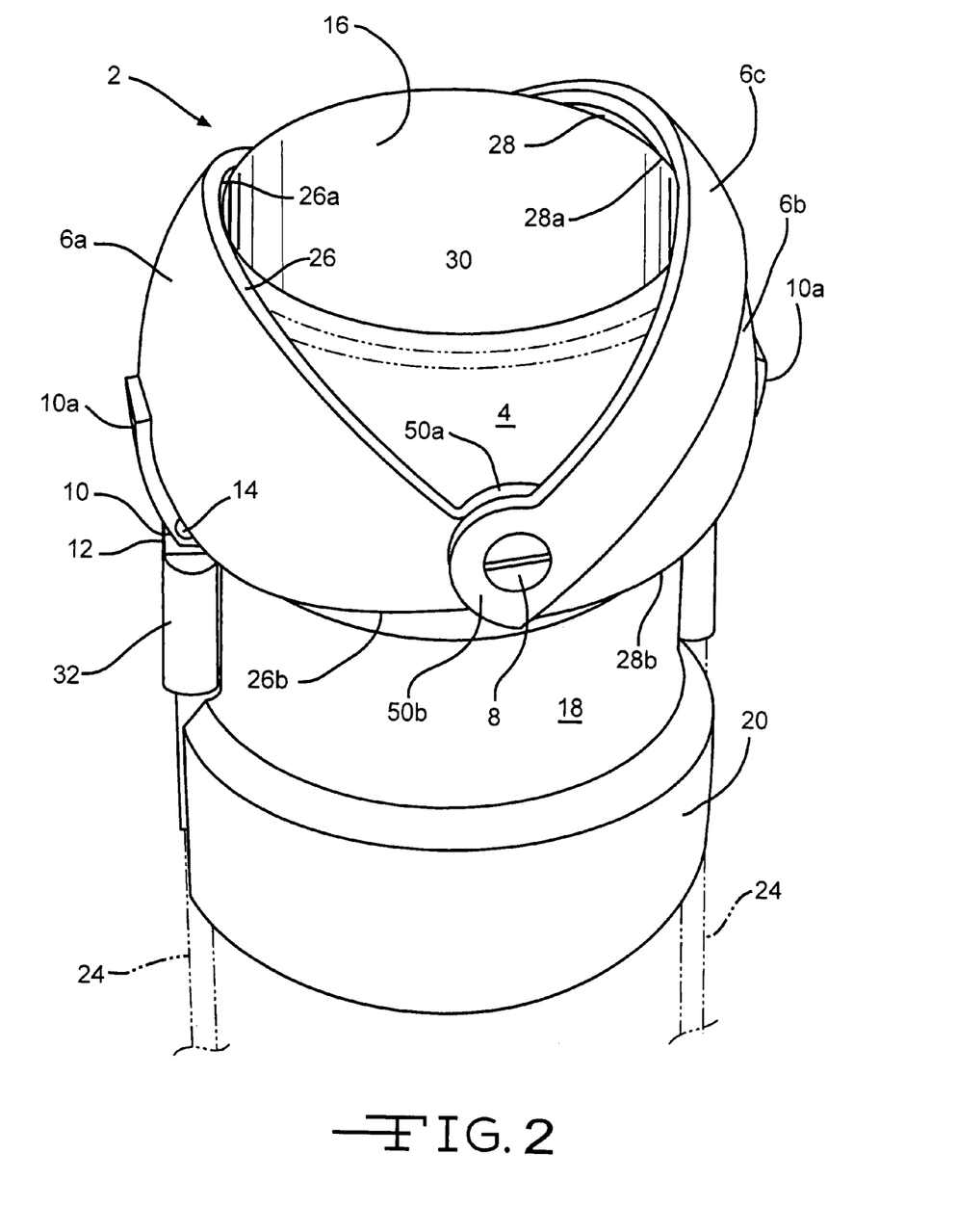
FIG. 2 is a front perspective view of the Control Valve in the open position.

Referring to FIG. 1 and to FIG. 2, Control Valve 2 is shown in a front perspective view in the closed position and the open position respectively, and comprises a spherical surface 4 with cut-off upper and lower portions. Arcuate lids 6a, 6b have a spheroidal/spherical shape with interior concave surfaces and are in close tolerance communication with the spherical surface 4 via hinge pins 8 which allows movement to the open and closed positions, and overlapping band 6c extending over the leading surface 28 of lid 6b forms a reception area for the leading surface 26 of lid 6a to help insure a good seal at intermittent closures of the tool or control valve 2 during the filling operation. A female clevis 10 with a skirt extension 10a is mounted on lids 6a, 6b for reception of a male clevis 12 which is secured in place via a clevis pin 14 passing through clevis 10, 12. The spherical surface 4 is provided with a cylindrical extension 18 and a mounting collar 20 for attachment to a funnel tube assembly, although the spherical surface 4 may be welded or otherwise attached directly to the filling tube (not shown). A common cylindrical interior passage 16 is provided through spherical surface 4, cylindrical extension 18 and collar 20 to allow for the flow of product. Cut-out grooved clearance 22 on each side of control valve 2 allows for attachment of an actuating or control arm 24 to the female threaded extension 32 of male clevis 12 for communication with a servo unit (not shown) to intermittently open and close lids 6a, 6b during the filling process.

With the tight tolerances generally desired for the control valve 2, the entire interior concave surface of the lids, and particularly leading sealing edges 26a, 28a and trailing sealing, edges 26b, 28b of the lids 6a, 6b are in close communication with spherical surface 4 except when the lids 6a, 6b travel beyond the outside circumferential edge of spherical surface 4, to provide a moving seal at all times during operation, to prevent loss of product. The trailing surface 26b of lid 6a and the trailing surface 28b of lid 6b extend to the terminal portions 50a, 50b of lids 6a; 6b through which hinge pin 8 passes therethrough.

Figure 3:
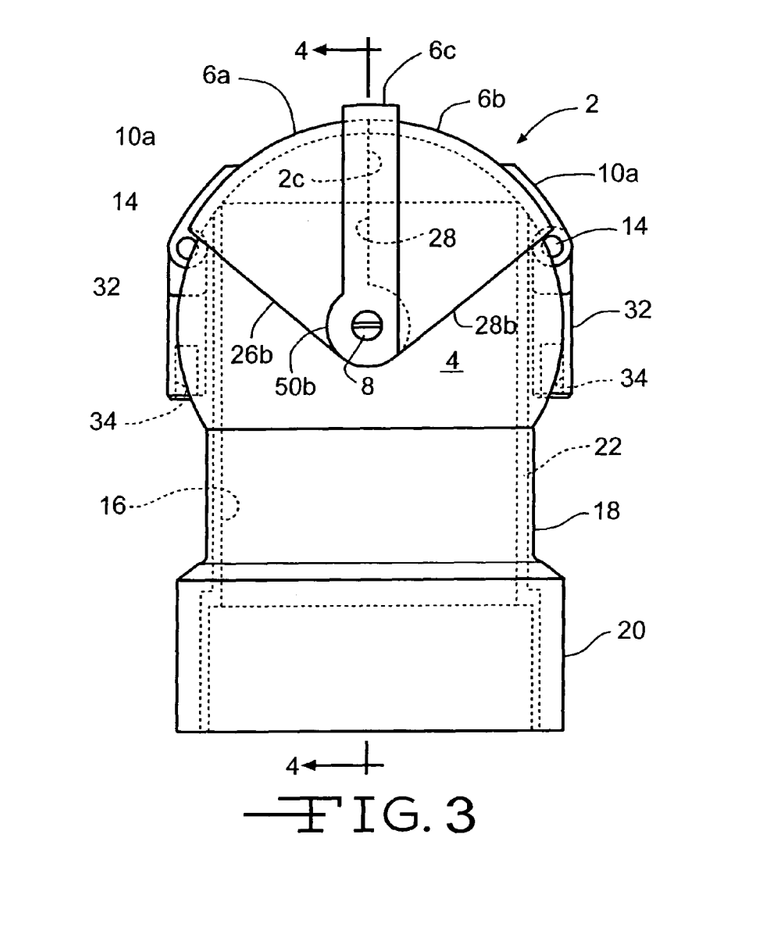
FIG. 3 is a side elevation view of the Control Valve.
Figure 4:
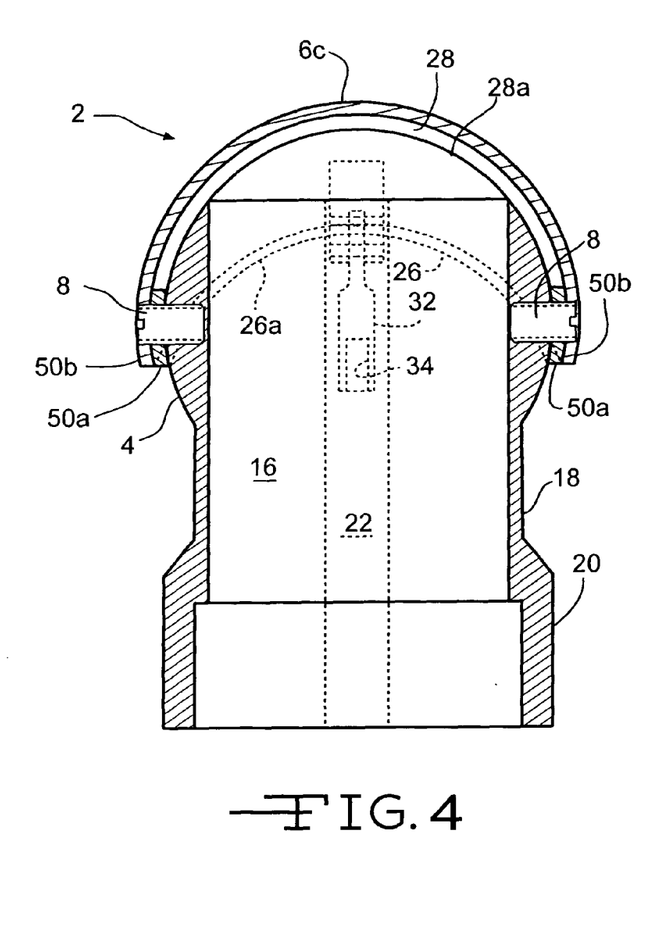
FIG. 4 is a cross-section view taken on line 4-4 of FIG. 3.

Referring to FIG. 3, showing the control valve 2 in a side elevation view and further referring to FIG. 4, showing a cross-section view taken on line 4-4 of FIG. 3, lids 6a, 6b are shown in the closed position, whereby overlapping band 6c receives the leading surfaces 26, 28 of lids 6a, 6b respectively to provide an improved intermittent seal during operation of the filling equipment. The spherical surface 4 has extending therefrom a cylindrical extension 18 and mounting collar 20, with a common interior diameter cylindrical passage 16 having an I.D. which matches the I.D. of the funnel tube to which the control valve 2 is attached, so that product does not accumulate. Hinge pin 8 secures terminal portions 50a, 50b of lids 6a, 6b to the spherical surface 4 to allow the opening and closing of lids 6a, 6b, to provide a moving seal with spherical surface 4 and lids 6a, 6b create an intermittent seal with each other when leading surfaces 26, 28 meet in the closed position.

Skirt extension 10a and female threaded extension 32 are shown joined via hinge pin 14, and female threads 34 within extension 32.

Figure 5:
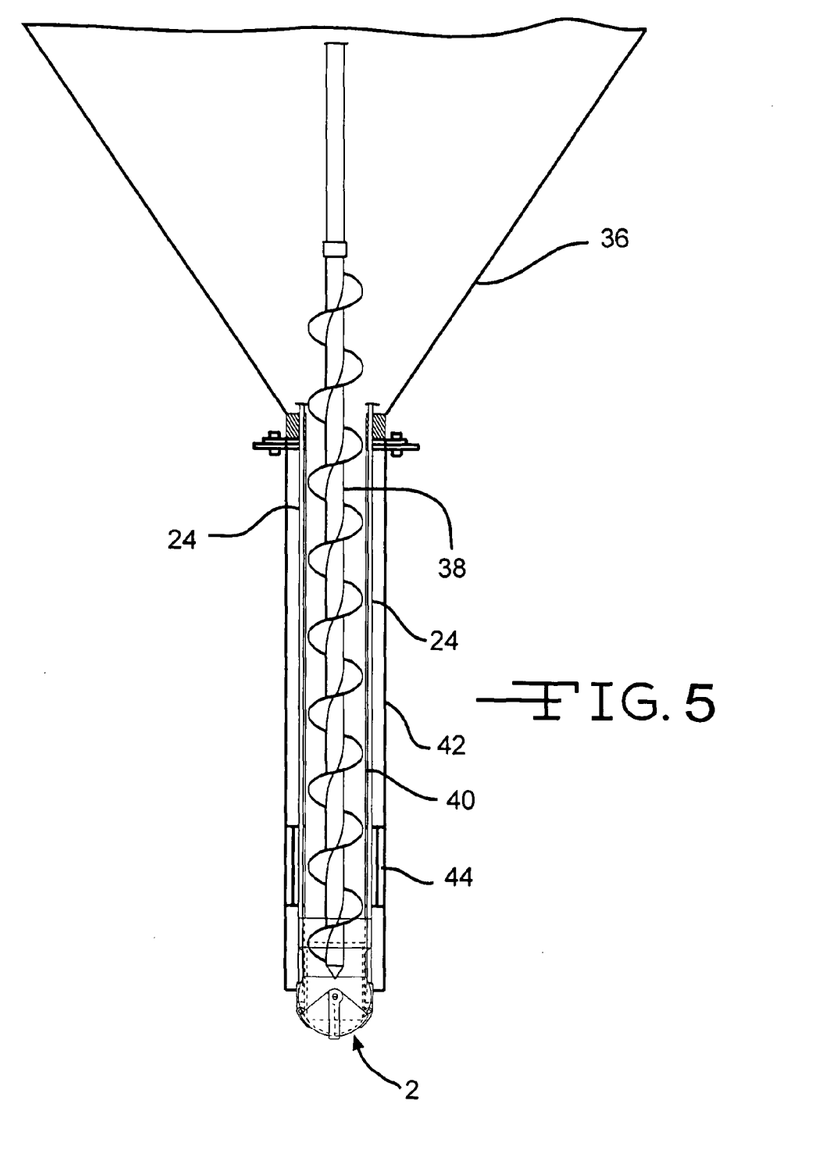
FIG. 5 is a partial cross-section view of a representation of a material delivery system.

Referring to FIG. 5, a partial cross-section view of a representation of a material delivery system, product is introduced via a hopper 36, auger 38, and funnel tube 40, the latter of which is attached to control valve 2 at its end, and the funnel tube 40 is housed within a bag sizing tube 42, with heating elements 44, shown in schematic, for sealing plastic packaging (not shown), and actuating or connecting rods, also known as control arms 24 are the means, when activated by a servo unit (not shown) to open and close control valve 2 during the filling operation.

Figure 6:
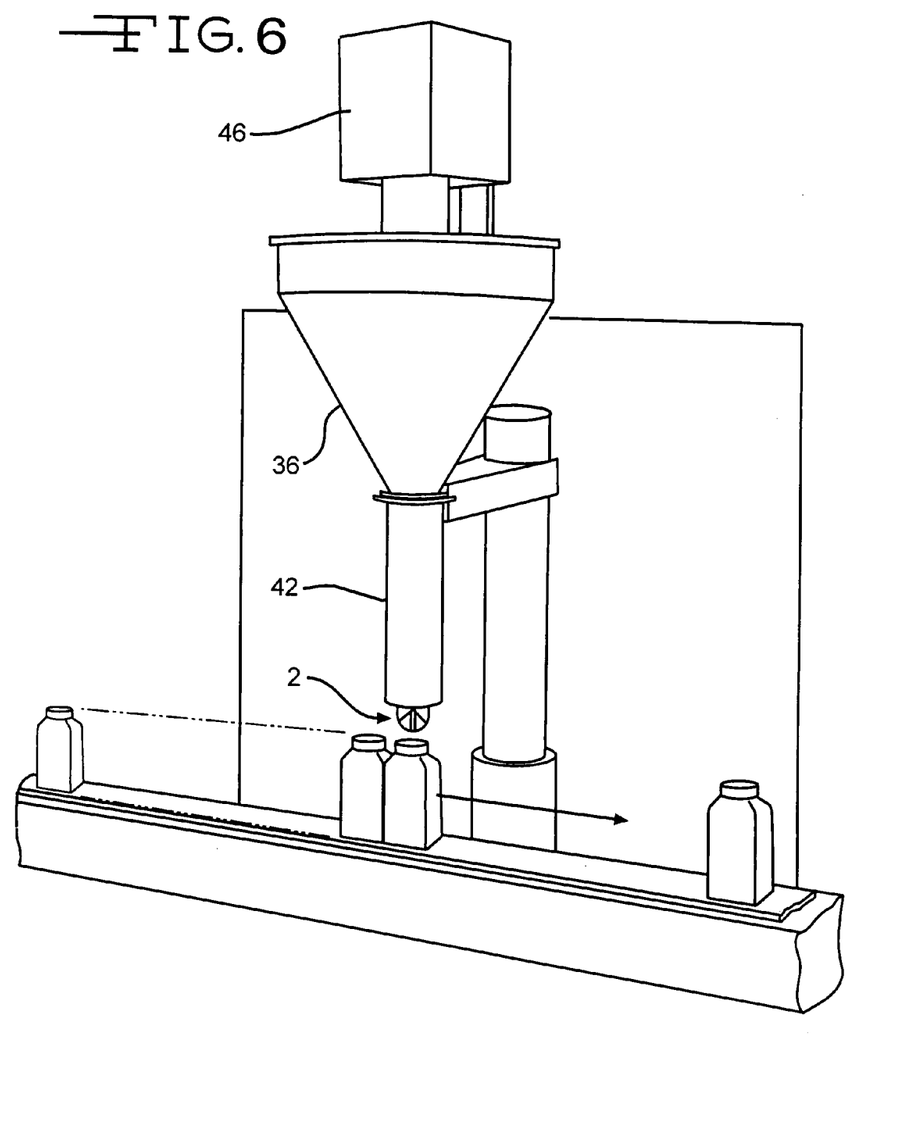
FIG. 6 is a front perspective view of a representation of an automated feed system.

Referring to FIG. 6, a front perspective view of an automated feed/filling system, a pneumatic activator unit 46 is shown above hopper 36, and the bag sizing tube 42 typically houses a portion of the control valve 2, which engages, intermittently, containers advancing in a given direction via a conveyor, generally at a high rate, about eighty (80) containers per minute.

Figure 7:
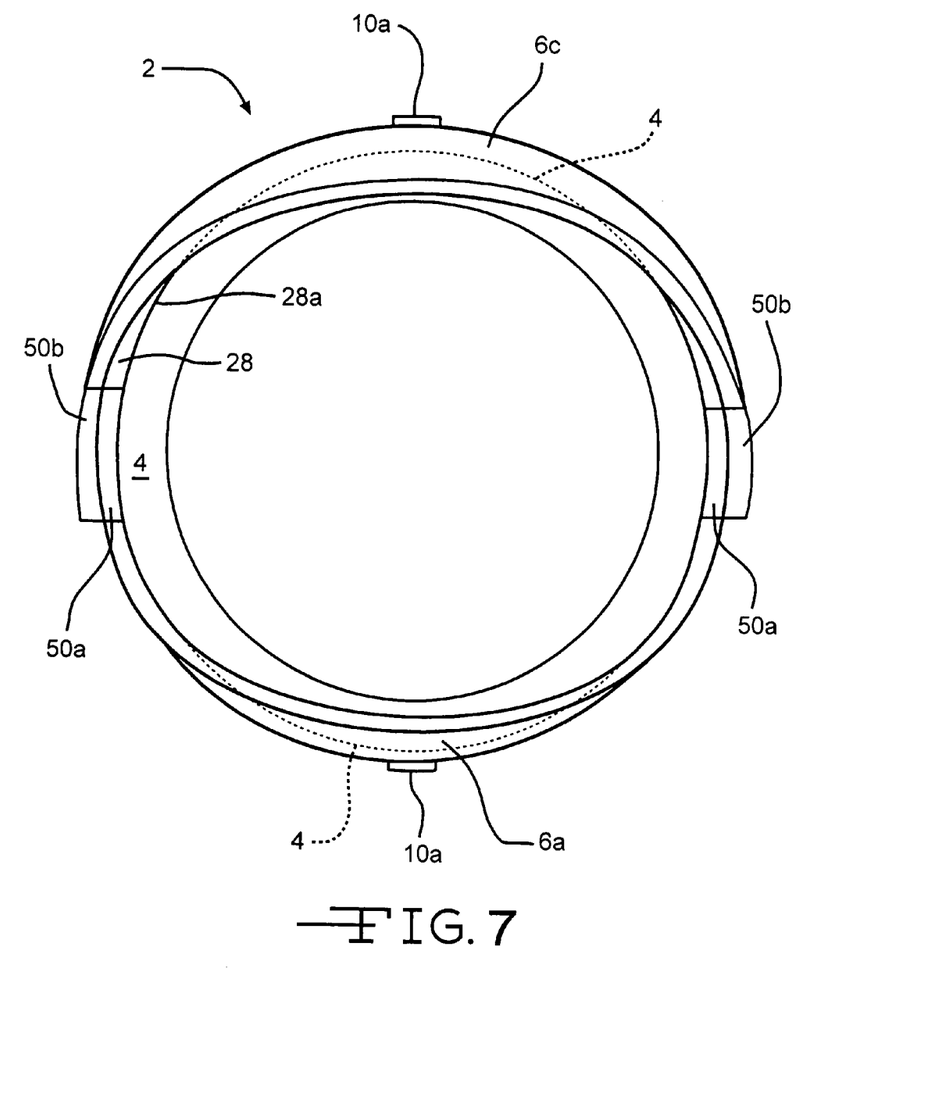
FIG. 7 is a top plan view of the control valve in the open position.

Referring to FIG. 7, a top plan view of the control valve 2 in the open position, lids 6a, 6b with overlapping band 6c are shown fully open for unencumbered flow of product through the cylindrical interior passage 16, and terminal portions 50a, 50b of lids 6a, 6b respectively are aligned in the hinged position onto spherical surface 4, showing the leading surfaces 26, 28 of lids 6a, 6b respectively and leading sealing edges 26a, 28a in close tolerance communication with the spherical surface 4 to provide a moving seal. Skirt extensions 10a, 10b are also shown.

Figure 8:
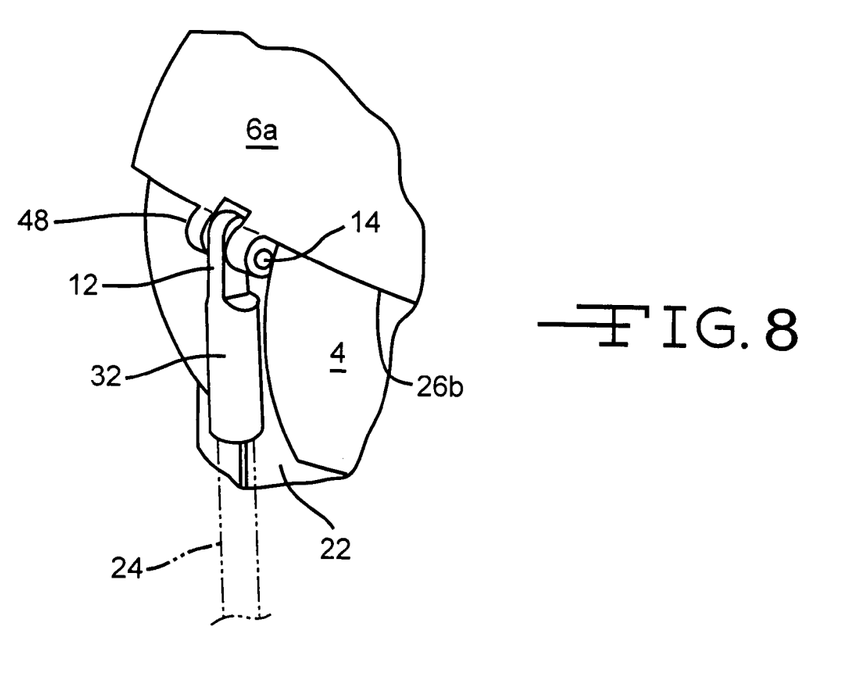
FIG. 8 is a fragmentary view of an alternate embodiment of the hinge construction of the lid.

Referring to FIG. 8, a fragmentary view of an alternative embodiment of the hinge construction of lid 6a, an integrally machined female clevis 48 extending from lid 6a for reception of the male clevis 12, secured by clevis pin 14, is preferred in some operating conditions, especially where tolerance with the bag sizing tube 42 is a factor. The trailing sealing surface 26b is shown in relation to spherical surface 4 and cut-out grooved clearance 22 is provided to allow the female threaded extension 32 of the male clevis 12 to travel up and down. Another advantage of employing an integrally machined female clevis 48 on lids 6a, 6b, is to allow the cylindrical interior passage 16 to be larger and unencumbered by any portion of lids 6a, 6b.

Generally, the cylindrical extension 18 of the spherical surface 4 and collar 20 can be eliminated in those instances where the control valve 2 is permanently attached to the funnel tube 40, such as by welding, without departing from the spirit or scope of this invention. The cut-out groove 22 may be only required where clearance is an issue, and the overlapping band 6c may be omitted (not shown) for some applications, also, without departing from the spirit or scope of this invention.

The invention claimed is:

1. A control valve for use with a material delivery system to meter a particulate stream comprising:
 a. a convex spherical surface with its upper and lower portions removed;
 b. a cylindrical extension ascending from said spherical surface;
 c. a mounting collar integral to said cylindrical extension;
 d. a common cylindrical interior passage through said spherical surface, cylindrical extension and mounting collar;

e. arcuate opposing lids of a spherical shape, having leading surfaces, said lids being hinged to said spherical surface, and said lids further comprising an interior concave surface of slightly larger radius than the radius of said spherical surface to provide a close tolerance, non-touching relationship with said spherical surface;

f. a pair of female clevises each being attached to said lids;

g. a pair of male devises in communication with said female clevises;

h. a clevis pin to secure said female and male devises in position; and i. an overlapping band of a spherical shape, comprising a slightly larger radius than the radius of the lids located on one of said lids to create a recessed area for reception of said leading surface of the other said lid whereby said lids when activated by external means, provide a barrier effect with said spherical surface to prevent the loss of said particulate at all times during the opening and closing of said lids and an intermittent seal at said leading surfaces of said lids when said lids are in the closed position.

2. The claim as claimed in claim 1, wherein said close tolerance, non-touching relationship between said interior concave surface of said lids and said spherical surface ranges from 0.001-0.005 inches.

3. The claim as claimed in claim 1, further comprising a female clevis extending from each of said lids to allow for more clearance when said control valve is positioned within a bag sizing tube of said material delivery system.

4. The claim as claimed in claim 1, further comprising a pair of cut-out vertical grooves common to said spherical surface, cylindrical extension and mounting collar, to allow for more clearance of said male devises when said control valve is positioned within a bag sizing tube of said material delivery system.

5. A control valve for dispensing a particulate stream comprising:

a. a convex spherical surface with its upper and lower portions removed, comprising a longitudinal interior cylindrical passage, and further comprising a pair of longitudinal grooves on each side of said spherical surface;

b. arcuate spherical opposing lids hinged to said spherical surface and said lids having leading surfaces, said lids comprising an interior concave surface of slightly larger radius than the radius of said spherical surface to provide a close tolerance, non-touching relationship with said spherical surface, at all times except when said lids clear the outer circumferential edge of said spherical surface, to provide a close tolerance, non-touching relationship with said spherical surface;

c. a pair of female devises extending from said lids;

d. a pair of male devises in communication with said female devises wherein said male devises travel substantially within said grooves when engaged by control arms from an external source to open and close said lids;

e. a clevis pin to secure said female and male devises in position; and f. an overlapping band, of a spherical shape, comprising a slightly larger radius than the radius of the lids, located on one of said lids to create a recessed area for reception of said leading surface of the other said lid; whereby said lids when activated by external means, provide a barrier effect with said spherical surface to prevent the loss of said particulate at all times during the opening and closing of said lids and an intermittent seal at said leading surfaces of said lids when said lids are in the closed position.

6. The claim as claimed in claim 5, wherein said lids further comprise a leading sealing edge and a trailing sealing edge relative to said spherical surface at all times during the opening and closing of said lids to prevent loss of said particulate during operation of said control valve.

7. The claim as claimed in claim 5, wherein said close tolerance relationship between said interior concave surface of said lids and said spherical surface ranges from 0.001-0.005 inches.

8. In combination with an apparatus for filling containers and packages with metered amounts of a particulate material at a high rate of speed, the improvement comprising a stainless steel control valve, said control valve further comprising:

a. a convex spherical surface with its upper and lower portions removed, and comprising an internal longitudinal cylindrical passage;

b. opposing arcuate lids comprising an interior concave surface of slightly larger radius than the radius of said spherical surface and a leading surface and a trailing surface, said lids being hinged to said spherical surface to provide a close tolerance, non-touching relationship with said spherical surface during opening and closing of said lids;

c. a pair of female clevises each integrally extending from said trailing surface of said lids;

d. a pair of male devises in communication with said female devises; and e. a pair of clevis pins to secure said female and male devises in position and to allow said male devises to swivel when attached to control arms activated by external means; whereby said lids when activated by said external means, provide an intermittent seal at said leading surface of said lids upon closing and provide a barrier effect relative to said spherical surface to prevent the loss of said particulate at all times during the opening and closing of said lids.

9. The claim as claimed in claim 8, wherein said lids further compromise a leading sealing edge and a trailing sealing edge relative to said spherical surface to provide a sealed chamber upon said lids closing to prevent loss of said material during operation of said control valve.

10. The claim as claimed in claim 8, further comprising a pair of longitudinal grooves on each side of said spherical surface, to accommodate longitudinal travel of said male devises during opening and closing of said lids.

11. The claim as claimed in claim 8, further comprising an overlapping band of a spherical shape, comprising a slightly larger radius than the radius of the lids, located on one of said lids to create an arcuate recessed area for additional sealing engagement proximate to said leading surface of the other said lid.

12. The claim as claimed in claim 8, wherein said opening and closing of said lids at said high rate of speed during the filling operation, with a powdery particulate material, suppresses leakage of said material and provides accurate metered amounts to said containers and packages.

13. The claim as claimed in claim 8, wherein said apparatus for filling further comprises a bag sizing tube which houses an auger-funnel tube assembly through which said material is intermittently advanced, and said upper portion of said spherical surface is attached directly to said funnel tube, whereby a portion of said control valve is housed within said bag sizing tube.

14. The claim as claimed in claim 13, wherein said internal longitudinal cylindrical passage comprises the same internal diameter as said funnel tube, and said control valve housed within said bag sizing tube allows said internal longitudinal cylindrical passage to be larger and unencumbered by any portion of said lids.

15. The claim as claimed in claim 8, wherein said spherical surface and said arcuate interior concave surfaces of said lids provide a close tolerance, non-touching relationship ranging from 0.001-0.005 inches.

16. The claim as claimed in claim 8, wherein said lids provide a close tolerance, non-touching relationship over substantially the entire surface area of said spherical surface within a range of 0.002-0.003 inches.

17. The claim as claimed in claim 8, wherein said control valve provides accurate metered amounts, eliminates loss of material, compression of material and interruption of sealing said packages during operation of said control valve.

\* \* \* \* \*